United States Patent
Yoshida et al.

(12) 
(10) Patent No.: US 6,879,502 B2
(45) Date of Patent: Apr. 12, 2005

(54) POWER SOURCE INVERTER CIRCUIT

(75) Inventors: Yoshifumi Yoshida, Chiba (JP); Fumiyasu Utsunomiya, Chiba (JP)

(73) Assignee: Seiko Instruments Inc., Chiba (JP)

(*) Notice: Subject to any disclaimer, the term of this patent is extended or adjusted under 35 U.S.C. 154(b) by 46 days.

(21) Appl. No.: 10/460,618

(22) Filed: Jun. 12, 2003

(65) Prior Publication Data

US 2004/0090806 A1 May 13, 2004

(30) Foreign Application Priority Data

Jun. 13, 2002 (JP) ........................................ 2002-172401

(51) Int. Cl.$^7$ .............................................. H02M 3/07
(52) U.S. Cl. ........................................ 363/60; 363/62
(58) Field of Search ................................ 323/222, 271, 323/282, 285; 363/59, 60, 62

(56) References Cited

U.S. PATENT DOCUMENTS 5,581,454 A * 12/1996 Collins ........................ 363/59
5,656,870 A * 8/1997 Turnbull ....................... 307/64
5,973,944 A * 10/1999 Nork ........................... 363/60
6,522,558 B2 * 2/2003 Henry ......................... 363/60

* cited by examiner

Primary Examiner—Jeffrey Sterrett
(74) Attorney, Agent, or Firm—Adams & Wilks

(57) ABSTRACT

A power source inverter circuit is provided which, when a feeding unit generates enough electric power, puts a load circuit into operation while storing electric power in a storage unit and, when the power feeding unit stops generating power, efficiently uses up the electric power stored in the storage unit. The power source inverter circuit is composed of: a variable DC—DC converter for raising or dropping a voltage of electric power that is supplied from the power feeding unit; the storage unit; MOSFET switches for connecting the power feeding unit and the storage unit to an input of the variable DC—DC converter and for connecting an output of the variable DC—DC converter to the storage unit and the load circuit; a control circuit for controlling gates of the MOSFET switches; and a voltage detector for monitoring output of the power feeding unit, the voltage of the storage unit, the input voltage of the load circuit, and for outputting voltage information to the variable DC—DC converter as well as to the control circuit.

5 Claims, 12 Drawing Sheets

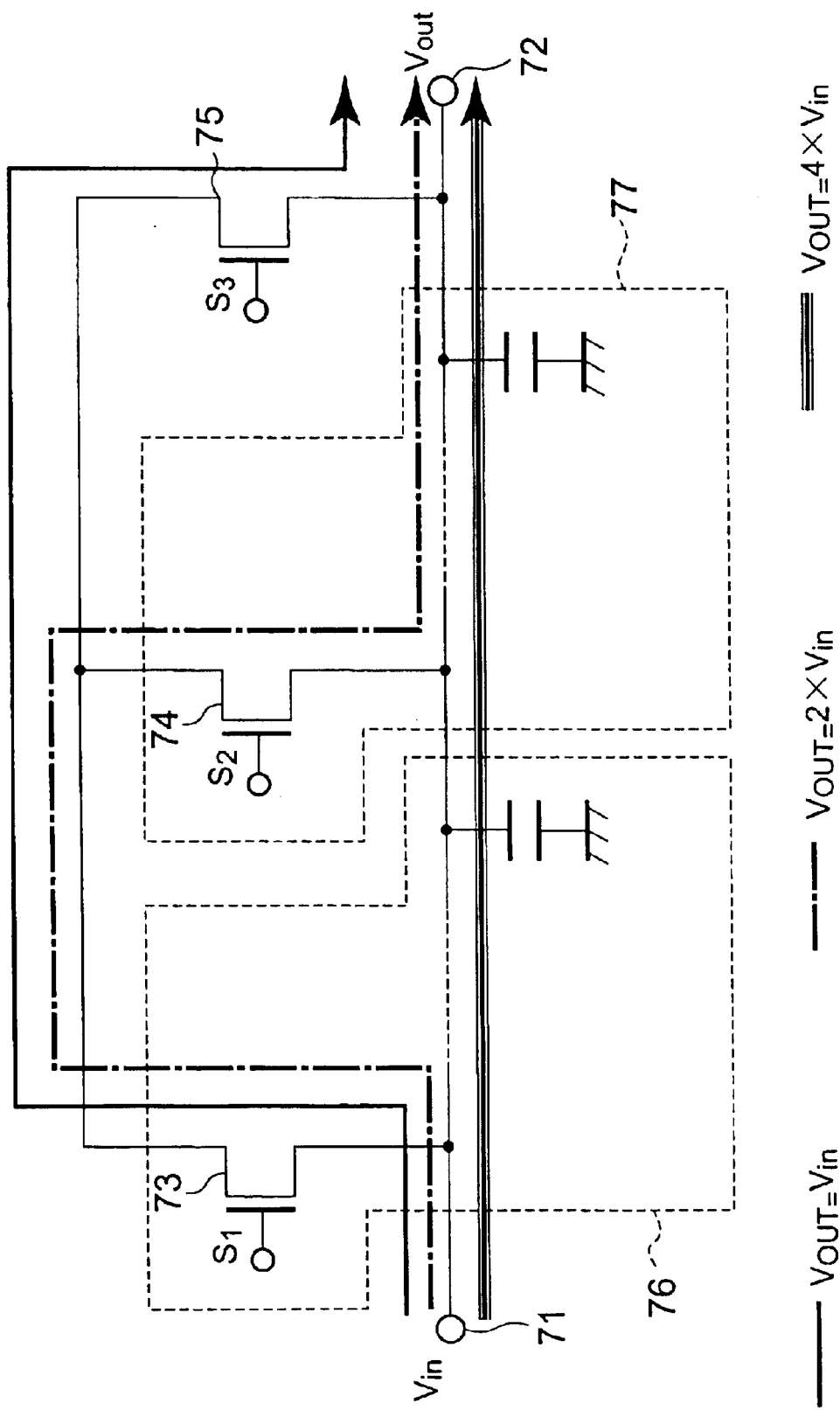

POWER SOURCE INVERTER CIRCUIT

BACKGROUND OF THE INVENTION

1. Field of the Invention

The present invention relates to a power source inverter circuit, more specifically, a power source inverter circuit for electronic instruments driven by use of output of a solar module or a thermoelectric conversion element in which electric power generated is supplied to a load circuit with efficiency and excess electric power is stored in storage means.

2. Description of the Related Art

Conventional power source inverter circuits supply a load circuit with electric power of power feeding means which changes its voltage and current with time or with a change in environment and have, as shown in FIG. 12, a DC—DC converter, a rectifier element for rectifying electric power outputted from the DC—DC converter, a voltage detector for detecting the voltage of the storage means, storage means for storing rectified electric power, and a load circuit. In such conventional power source inverter circuits where a load circuit is supplied with electric power of a solar module, a thermoelectric conversion circuit, or other similar power feeding means which changes its voltage and current with time or with a change in environment, operation of a DC—DC converter is controlled by monitoring the voltage with a voltage detector such that the DC—DC converter is put into operation when electric power supplied from the power feeding means has a voltage equal to or higher than the minimum operation voltage of the DC—DC converter and that the voltage of the storage means reaches a given output voltage. For instance, if the DC—DC converter is a switched capacitor type DC—DC converter, the output voltage is kept constant by turning the DC—DC converter on and off for intermittent operation.

The electric power that has undergone voltage conversion is rectified by a rectifier element such as a Schottky diode, and then stored in the storage means through charging. At this point, the electric power stored in the storage means is supplied to the load circuit since the charging means and the load circuit are connected in parallel to each other. The load circuit is put into operation as the stored voltage of the charging means reaches the minimum drive voltage of the load circuit or higher. Accordingly, when the storage means has large capacity, the voltage of the storage means is slow to rise and activation takes extremely long. Thus prior art requires, for continuous operation of the load circuit, efficient charging of the storage means without exhausting the storage means of electric power and without allowing the voltage of the storage means to drop lower than the minimum drive voltage of the load circuit.

In addition, the step-up and step-down multiple numbers are fixed in conventional power source inverter circuits in the case of using switched capacitor type DC—DC converters as the DC—DC converters. In this case, charging cannot be conducted when there is a change in output voltage of the power feeding means and either raising or lowering the voltage cannot help the output voltage of the DC—DC converter from dropping below the output of the storage means.

Furthermore, the load circuit, which operates on electric power stored in the storage means after output of the power feeding means becomes unavailable, stops its operation once the voltage of the storage means drops below the minimum operation voltage of the load circuit. At this point, there are still electric charges left in the storage means.

Examples of the above-described means for feeding electric power that changes its voltage with time include thermoelectric conversion elements and solar panels for use in portable electronic instruments that are relatively small in power consumption. For instance, thermoelectric conversion elements, which employ PN junction between a P type semiconductor and an N type semiconductor to generate electric power from an electromotive force created by a temperature difference, change their electromotive forces (voltage) as the temperature difference changes with time.

In such conventional power source inverter circuits, supplying the load circuit with a constant voltage requires stopping the operation of the DC—DC converter or adjusting the amount of electric power taken out. The amount of electric power taken out is accordingly no larger than the amount of electric power needed by the load circuit even when the power feeding means is capable of generating and outputting more. This means that the excess electric power goes to waste. In particular, power feeding means such as a solar module or a thermoelectric conversion circuit is quick to change its output voltage in response to a change in environment or with time, thereby making it difficult to maintain the same level of output performance. Accordingly, it is necessary to take as much electric power as possible out of the power feeding means while the power feeding means has high power generation ability, namely, when the amount of light is very large or when there is a heat source.

In addition, in power feeding means that uses a natural energy source, such as a solar module or a thermoelectric conversion circuit, the relation between the output voltage and the output current has a local maximal value which equals to the maximum power generation efficiency. Since power feeding means that uses a natural energy source is small in energy amount, it is desirable to take out electric power always with the maximum power generation efficiency. Here lies another inconvenience because, in conventional power source inverter circuits where the amount of electric power to be taken out of the power feeding means is determined in accordance with power consumption of the load circuit, electric power is rarely taken out with the maximum power generation efficiency and the excess power is wasted.

Conventional power source inverter circuits, where the storage means and the load circuit are connected in parallel to the output of the rectifier element, have still another inconvenience: the storage empty of electric charges induces a voltage drop even when the output of the DC—DC converter is equal to or higher than the operation voltage of the load circuit and it is not until some electric charges are stored in the storage means that the load circuit can start its operation.

Furthermore, in conventional power source inverter circuits that use switched capacitor type DC—DC converters, the step-up multiple number or the step-down multiple number is fixed and therefore electric power cannot be stored once the output voltage of the DC—DC converter becomes lower than the voltage of the storage means irrespective of power conversion performed on the output power of the power feeding means which changes its output voltage with time or with a change in environment.

Yet another inconvenience is that the load circuit, which operates on electric power stored in the storage means when the power feeding means no longer generates power which changes its output voltage with time or with a change in environment, stops its operation as the voltage of the storage means drops below the minimum operation voltage of the load circuit. A mere voltage drop renders the load circuit ineffective even though there are enough electric power left in the storage means. Accordingly, the remaining electric power goes to waste.

SUMMARY OF THE INVENTION

The present invention has been made in view of the above-mentioned inconveniences of prior art, and an object of the present invention is therefore to provide a power source inverter circuit which, when power feeding means generates enough electric power, puts a load circuit into operation while storing electric power in storage means and, when the power feeding means stops generating power, efficiently uses up the electric power stored in the storage means.

In order to attain the above-mentioned object a power source inverter circuit according to the present invention includes: a variable DC—DC converter for raising or dropping a voltage of electric power which is supplied from power feeding means; storage means for storing electric power whose voltage has been raised or dropped by the variable DC—DC converter; a MOSFET switch for connecting an output of the power feeding means to an input of the variable DC—DC converter; a MOSFET switch for connecting an output of the variable DC—DC converter to an input of the storage means; a MOSFET switch for connecting the output of the variable DC—DC converter to an input of a load circuit; a MOSFET switch for connecting the input of the variable DC—DC converter to the input of the storage means; a control circuit for controlling gates of the respective MOSFET switches; and a voltage detector for monitoring an output voltage of the power feeding means, a voltage of the storage means, and an input voltage of the load circuit, and for outputting voltage information to the variable DC—DC converter and to the control circuit.

According to the power source inverter circuit of the present invention, when the voltage detector detects that the power feeding means is generating and supplying electric power, the control circuit turns on the MOSFET switch that connects the output of the power feeding means and the input of the variable DC—DC converter to each other, so that the generated electric power is inputted to the variable DC—DC converter. The voltage detector further monitors the output voltage of the power feeding means and determines the step-up multiple number and step-down multiple number of the DC—DC converter, which operates based on these multiple numbers. The control circuit next turns on the MOSFET switch that connects the output of the variable DC—DC converter and the input of the load circuit to each other, so that output of the variable DC—DC converter which has been raised or dropped in voltage is supplied to the load circuit. At this point, if the electric power supplied from the variable DC—DC converter is larger than the one used in the load circuit, the control circuit turns off the MOSFET switch that connects the output of the variable DC—DC converter and the input of the load circuit to each other whereas the MOSFET switch that connects the output of the variable DC—DC converter and the input of the storage means to each other is turned on to supply the electric power to the storage means. The load circuit is thus supplied with electric power with a constant voltage.

Moreover, electric power can always be taken out with the maximum power generation efficiency since the number of step-up and step-down stages of the variable DC—DC converter is determined by monitoring the output voltage of the power feeding means. In addition, as much electric power as possible is taken out of the power feeding means and stored in the storage means while the power feeding means has high power generation ability.

Furthermore, the load circuit can immediately be put into operation as long as the output voltage of the variable DC—DC converter is equal to or higher than the minimum operation voltage of the load circuit even when no electric charges are in the storage means. This is because the power source inverter circuit of the present invention has the MOSFET switch that connects the output of the variable DC—DC converter and the input of the storage means to each other and the MOSFET switch that connects the output of the variable DC—DC converter and the input of the load circuit to each other.

When the power feeding means stops generating and supplying electric power, the voltage detector detects this fact and the control circuit turns off the MOSFET switch that connects the output of the power feeding means and the input of the variable DC—DC converter to each other whereas the MOSFET switch that connects the input of the variable DC—DC converter and the input of the storage means to each other is turned on to input electric charges stored in the storage means to the variable DC—DC converter. The voltage detector monitors the voltage of the storage means and determines the step-up multiple number and step-down multiple number of the DC—DC converter, which operates based on these multiple numbers. The control circuit next turns on the MOSFET switch that connects the output of the variable DC—DC converter and the input of the load circuit to each other, so that output of the variable DC—DC converter which has been raised or dropped in voltage is supplied to the load circuit. At this point also, if the electric power supplied from the variable DC—DC converter is larger than the one used in the load circuit, the control circuit turns off the MOSFET switch that connects the output of the variable DC—DC converter and the input of the load circuit to each other, so that the load circuit is supplied with electric power with a constant voltage. In this way, an inconvenience of the load circuit being halted in its operation as the voltage of the storage means drops lower than the minimum operation voltage of the load circuit is eliminated and every bit of electric power stored in the storage means can be put into use.

BRIEF DESCRIPTION OF THE DRAWINGS

In the accompanying drawings:

FIG. 8 is a diagram showing an operation of the variable DC—DC converter according to a mode of the present invention;

DETAILED DESCRIPTION OF THE PREFERRED EMBODIMENTS

Referring to the accompanying drawings, a detailed description will be given below on embodiments of a power source inverter circuit according to the present invention. A power source inverter circuit of this embodiment is for use in a portable instrument having as power feeding means a solar module, a thermoelectric conversion element, or a generator using a motor, which generates electric power varying in voltage and amount depending on environment and time, and aims at efficiently storing electric power generated and consuming the electric power with efficiency.

Figure 1:
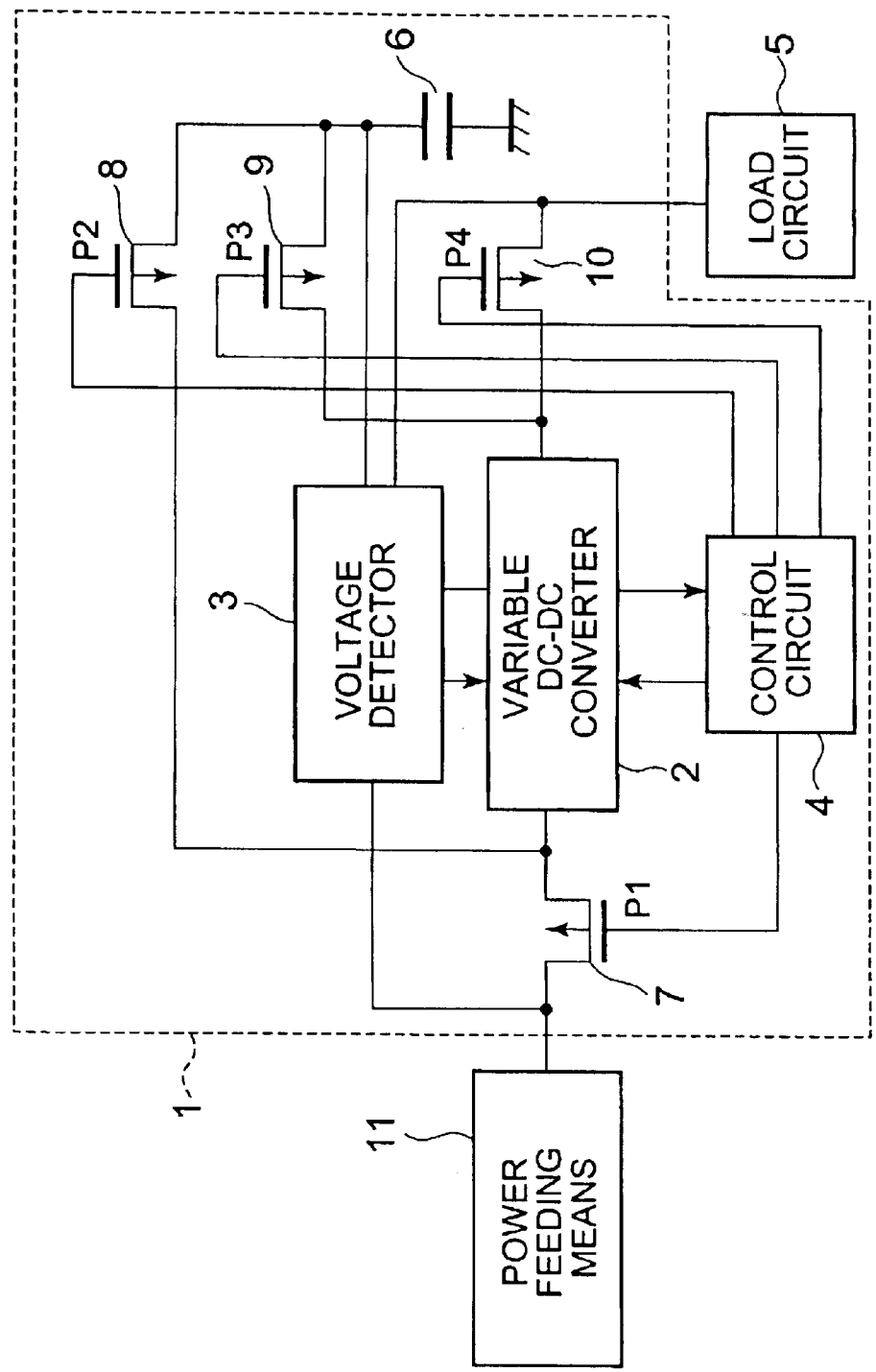
FIG. 1 is a block diagram showing an outline of the structure of a power source inverter circuit according to an embodiment of the present invention.

FIG. 1 is a block diagram showing an outline of a structure of a power source inverter circuit 1 according to this embodiment. The power source inverter circuit 1 of the present invention is composed of: a variable DC—DC converter 2 for raising or dropping the voltage of electric power which is supplied from power feeding means 11; a capacitor 6 for storing electric power whose voltage has been boosted or dropped by the variable DC—DC converter 2; a MOSFET switch (P1) 7 for connecting an output of the power feeding means 11 of a solar module, a thermoelectric conversion element, a generator that uses a motor, or the like to an input of the variable DC—DC converter 2; a MOSFET switch (P3) 9 for connecting an output of the variable DC—DC converter 2 to an input of the capacitor 6; a MOSFET switch (P4) 10 for connecting the output of the variable DC—DC converter 2 to an input of a load circuit 5; a MOSFET switch (P2) 8 for connecting the input of the variable DC—DC converter 2 to the capacitor 6; a control circuit 4 for controlling the above four MOSFET switches; and a voltage detector 3 for monitoring the output voltage of the power feeding means 11, the voltage of the capacitor 6, and the input voltage of the load circuit 5, and for outputting voltage information to the variable DC—DC converter 2 and to the control circuit 4. The effect the power source inverter circuit of the present invention provides is greater particularly when its circuits are configured using semiconductor devices that are formed on a semiconductor film formed through an insulating film on a supporting substrate, namely, fully-depleted SOI devices.

The power feeding means 11 is a solar module, or a thermoelectric conversion element, or a generator that uses a small-sized rotor to convert a rotational energy into electric power. Such power feeding means is varied in voltage and amount of electric power generated or in power generation duration depending on its environment including light, heat, and motion, and therefore requires a power source inverter circuit which makes it possible to fully utilize the electric power generated. A solar module and a small-sized rotor generator can output an almost constant voltage as long as there is no change in intensity of light or in dynamic. On the other hand, the output voltage of a thermoelectric conversion element changes greatly even when the heat quantity is constant. The power source inverter circuit 1 of the present invention is particularly effective for such power feeding means as a thermoelectric conversion element.

Figure 2:
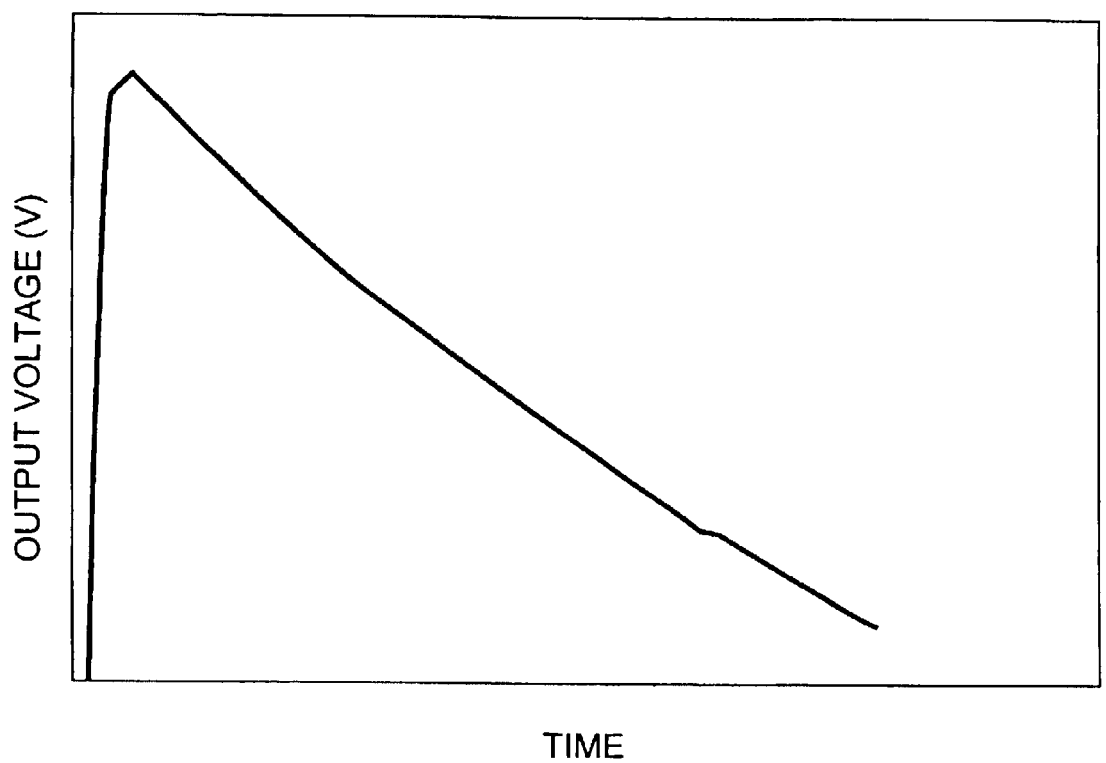
FIG. 2 is a graph showing a power generation output characteristic of a thermoelectric conversion element.

In a thermoelectric conversion element, for example, a P type thermoelectric material element and an N type thermoelectric material element are sandwiched between two substrates and are joined on the substrates through a metal or other conductive substance forming a PN junction. The plural P type and N type elements are alternately connected in series (P, N, P, N . . . ). When there is a temperature difference between one PN junction and another PN junction of the thermoelectric conversion element, an electric potential difference (electromotive force) according to the temperature difference is created. Therefore higher voltage is obtained by increasing the number of PN junctions. FIG. 2 shows a change with time of the voltage generated as a temperature difference is created between the above two substrates. The voltage abruptly rises immediately after a temperature difference is created between the substrates of the thermoelectric conversion element and then, past a certain peak, the voltage gradually drops until it reaches saturation at a certain level. The initial abrupt voltage rise takes place because, immediately after the temperature difference is created between the substrates, the thermoelectric conversion element can generate a high voltage from the temperature difference. The subsequent voltage drop takes place because the heat of one of the substrates is transmitted with time to the other substrate through the P type and N type thermoelectric material elements to thereby reduce the temperature difference and resultantly reduce the voltage generated. For that reason, in a conventional thermoelectric conversion element, the output voltage is secured by connecting thermoelectric material elements in series in order to ensure that a load circuit continues to operate after the output voltage reaches saturation, namely, past the voltage peak of the generated electric power in FIG. 2. However, connecting elements in series leads to an increase in internal resistance of the thermoelectric conversion element, making it difficult to secure enough current. Moreover, increasing serial connection results in an increase in size of the thermoelectric conversion element, which causes a problem in that the thermoelectric conversion element is undesirable for portable terminals. In contrast, the power source inverter circuit of the present invention can output a constant voltage to the load circuit 5 because the circuit has the variable DC—DC converter 2, which raises the voltage of electric power generated by the power feeding means 11 when the voltage becomes lower than the operation voltage of the load circuit 5.

The variable DC—DC converter 2 is either a switched capacitor type DC—DC converter which uses a capacitor, or an LC type DC—DC converter which uses a coil.

Figure 3A:
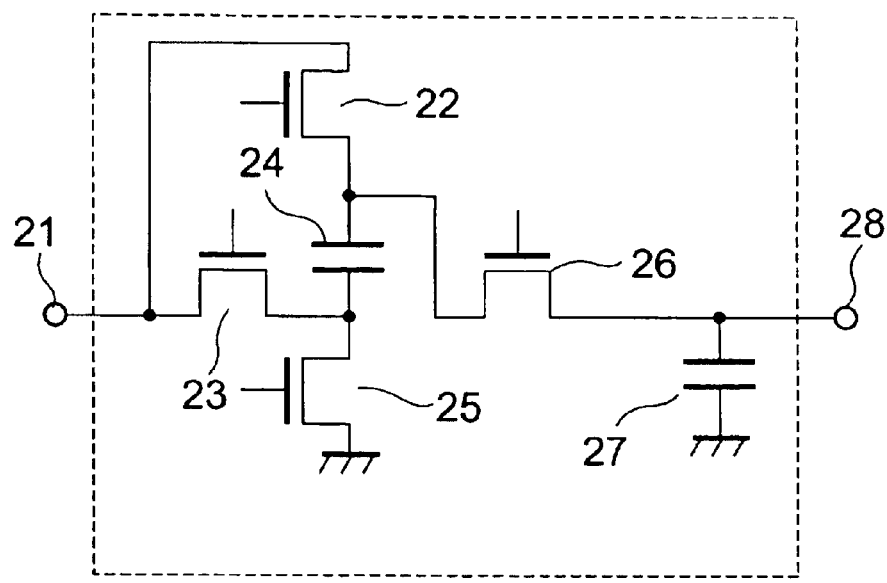
FIGS. 3A and 3B are a schematic circuit diagram of a step-up switched capacitor type DC—DC converter according to a mode of the present invention and an operation schematic diagram thereof, respectively.
Figure 3B:
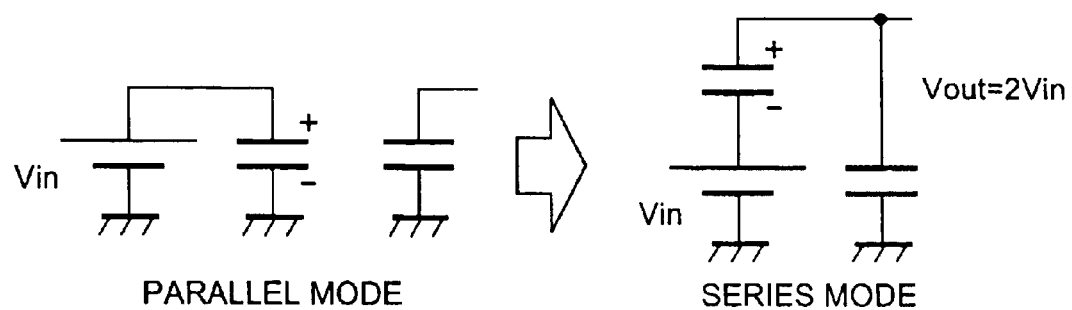

The switched capacitor type DC—DC converter determines the step-up number or step-down number based on voltage detection information sent from the voltage detector 3, and outputs power after voltage conversion. The switched capacitor type DC—DC converter can raise or drop the voltage inputted by repeating parallel connection or serial connection among capacitors or between capacitors and a power supply. FIG. 3A shows a basic step-up circuit of the switched capacitor type DC—DC converter. FIG. 3B is a schematic diagram showing the operation thereof. According to the wire connection of the switched capacitor type DC—DC converter, an input terminal 21 is connected to drains of transistors 22 and 23 while a source of the transistor 22, one of terminals of a capacitor 24, and a drain of a transistor 26 are connected to one another. The other terminal of the capacitor 24 is connected to a source of the transistor 23 and to a drain of a transistor 25. A source of the transistor 25 is grounded. A source of the transistor 26 is connected to one of terminals of a capacitor 27 and to an output terminal 28. The other terminal of the capacitor 28 is grounded.

In raising the voltage, a voltage twice the input voltage can be obtained by connecting the power supply and the capacitors in parallel to each other and then switching it to serial connection between the capacitors and the power supply. Although the description here deals with double boost using capacitors and a power supply, triple or quadruple boost is possible if the number of capacitors is increased. It is also possible to drop the input voltage by using a circuit shown in FIG. 4A and by operating the circuit in a manner illustrated in FIG. 4B. According to the wire connection in the step-down circuit of the switched capacitor type DC—DC converter, an input terminal 31 is connected to a drain of a transistor 32. A source of the transistor 32 is connected to one of terminals of a capacitor 34 and to a drain of a transistor 33. The other terminal of the capacitor 34 is connected to a drain of a transistor 35 and to a drain of a transistor 36. A source of the transistor 35 is grounded. A source of the transistor 36 is connected to a source of the transistor 33, one of terminals of a capacitor 37, and an output terminal 38. The other terminal of the capacitor 37 is grounded.

Figure 5:
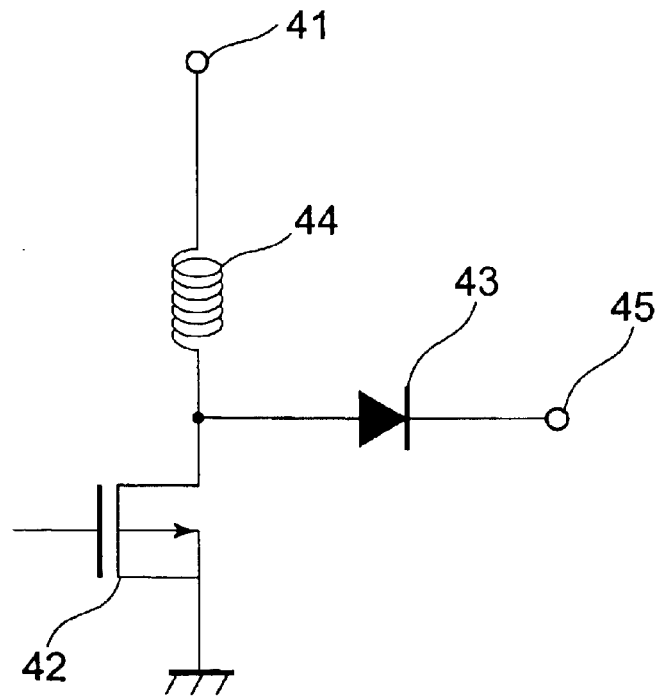
FIG. 5 is a schematic circuit diagram of a step-up LC type DC—DC converter according to a mode of the present invention.

The LC type DC—DC converter outputs electric power after performing voltage conversion thereon by changing switching timing of internal transistors on the basis of voltage detection information sent from the voltage detector 3. FIG. 5 is a diagram showing a basic step-up circuit of the LC type DC—DC converter. An input terminal 41 is connected to one of terminals of an inductor 44. The other terminal of the inductor 44 is connected to a drain of a transistor 42 and to an anode of a diode 43. A source of the transistor 42 is grounded. A cathode of the diode 43 is connected to an output terminal 45. A voltage is applied to a gate of the transistor 42 to cause a current flow between the source and the drain of the transistor 42, which in turn causes a current flow into the inductor 44. Thereafter, a gate of the transistor 42 is turned off to cut the current flow between the source and the drain. This causes electromagnetic induction and the boosted voltage is outputted through the diode 43. PWM control or PFM control is employed as a control method for turning on and off the gate of the transistor 42. The LC type DC—DC converter is advantageous in that it can output an arbitrary voltage by changing the gate on/off control frequency. On the other hand, the LC type DC—DC converter is disadvantageous in that external parts such as an inductor are needed and that the power conversion efficiency drops when the voltage output is low.

Figure 6:
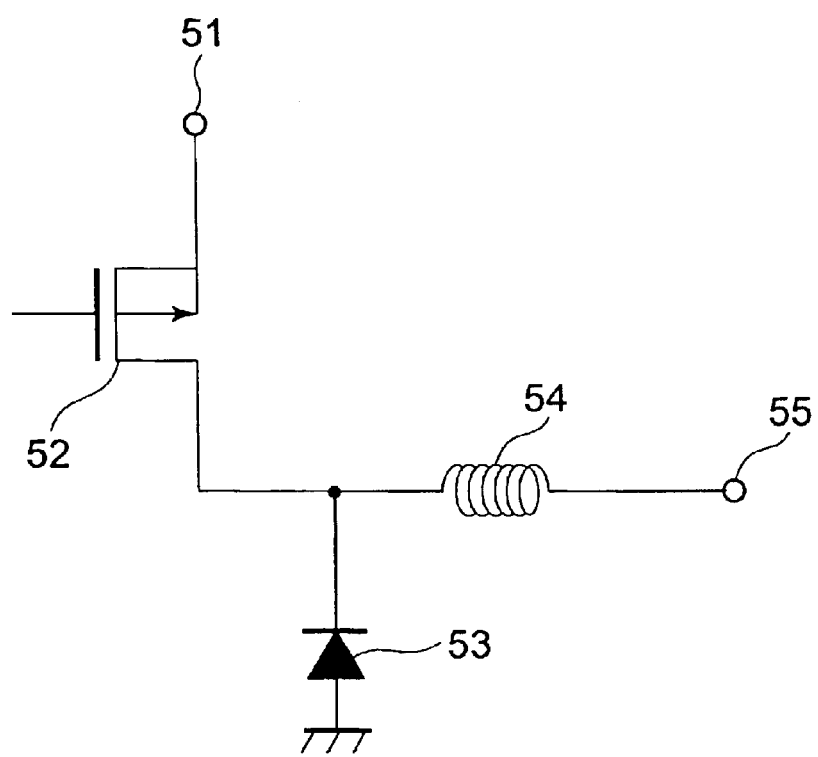
FIG. 6 is a schematic circuit diagram of a step-down LC type DC—DC converter according to a mode of the present invention.

FIG. 6 is a diagram showing a basic step-down circuit of the LC type DC—DC converter. An input terminal 41 is connected to a source of a transistor 52. A drain of the transistor 52 is connected to one of terminals of an inductor 54 and to a cathode of a diode 53. An anode of the diode is grounded. The other terminal of the inductor 54 is connected to an output terminal 55. Similar to the step-up circuit, a gate of the transistor 52 is turned on and off by PWM control or PFM control. The thus dropped voltage is applied to cause a current flow between the source and the drain of the transistor 42, which in turn causes a current flow into the inductor 44. Thereafter, the gate of the transistor 42 is turned off to cut the current flow between the source and the drain. This causes electromagnetic induction and the dropped voltage is outputted through the diode 43. PWM control or PFM control is employed as a control method for turning on and off the gate of the transistor 42.

Figure 4A:
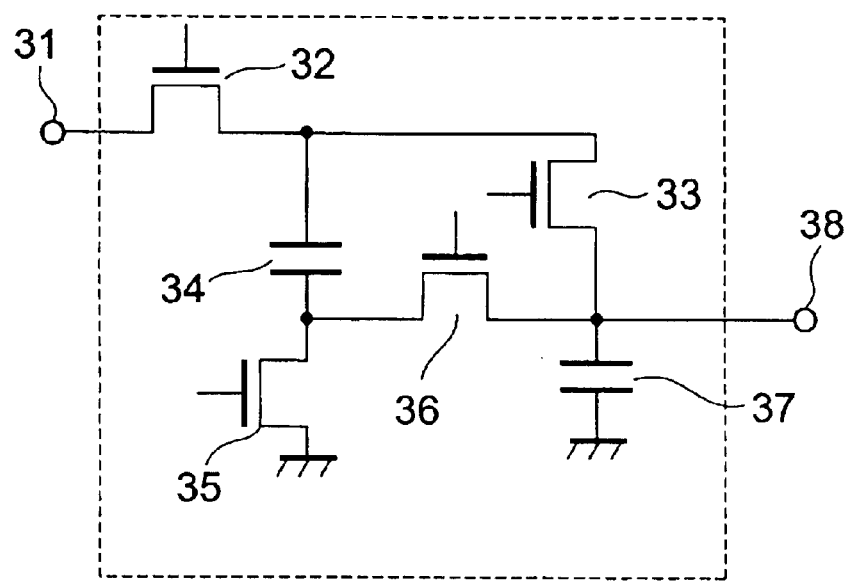
FIGS. 4A and 4B are a schematic circuit diagram of a step-down switched capacitor type DC—DC converter according to a mode of the present invention and an operation schematic diagram thereof, respectively.
Figure 4B:
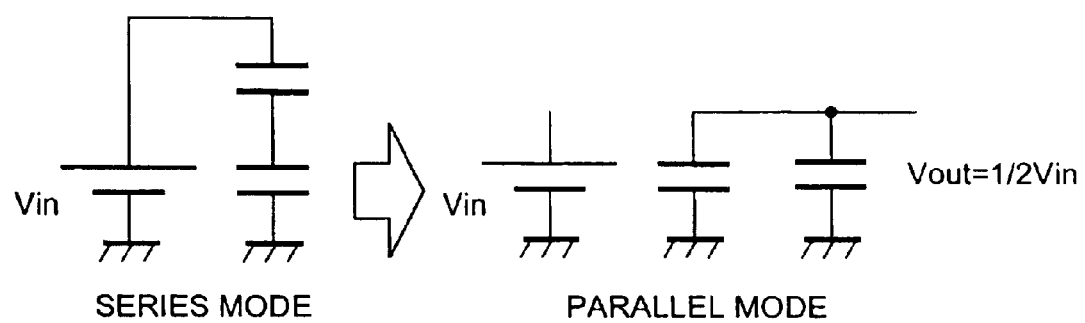
Figure 7:
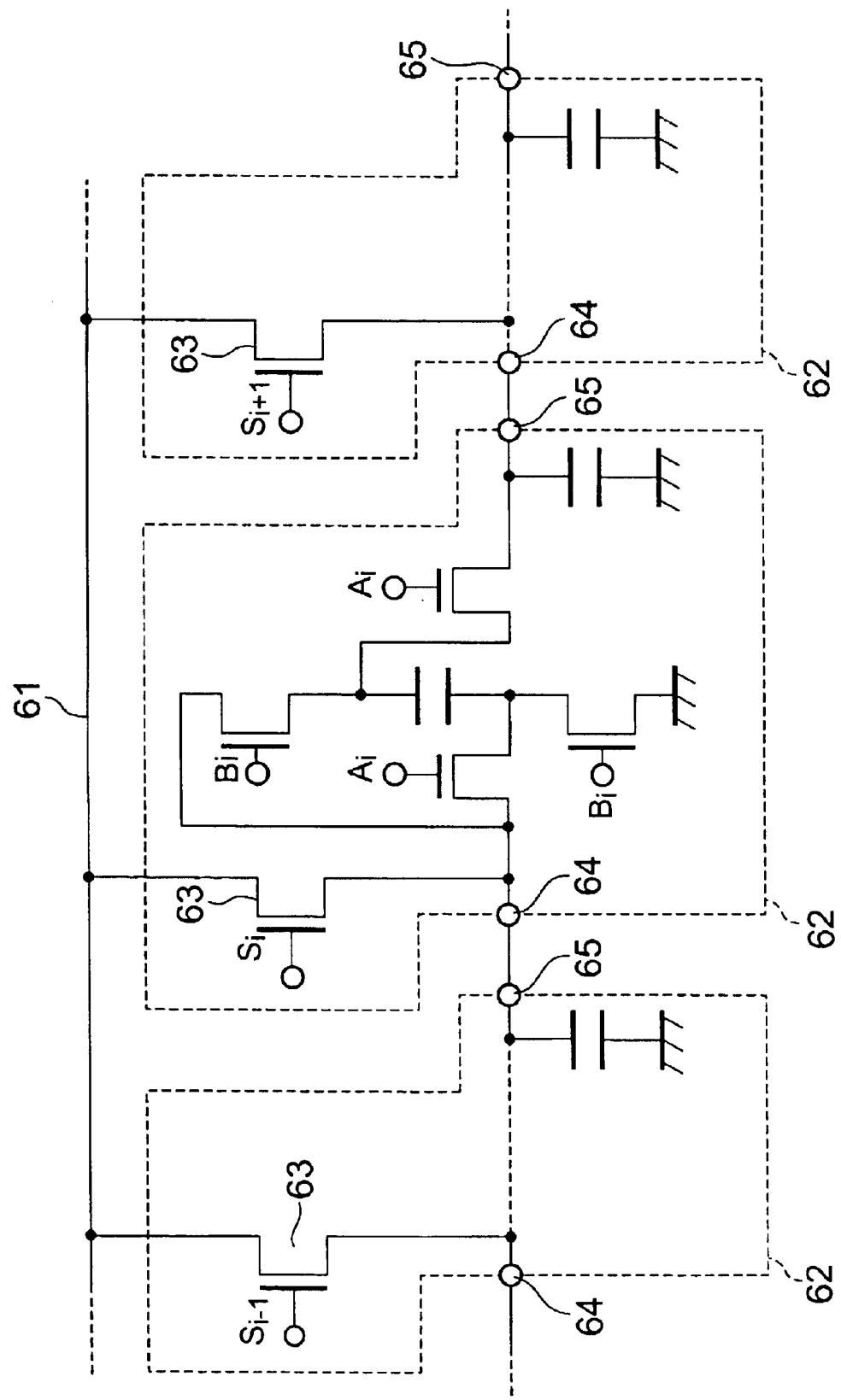
FIG. 7 is a schematic structural diagram of a variable DC—DC converter according to a mode of the present invention.

In the case where a switched capacitor type DC—DC converter is employed for the variable DC—DC converter, the switched capacitor type DC—DC converter circuit shown in FIG. 3A or FIG. 4A is combined with a bypass transistor 63 to form a basic block (SC block) 62, and then an input terminal 64 of this SC block 62 is connected to an output terminal 65 of another SC block 62 forming cascade connection as shown in FIG. 7.

Now, the role of the bypass transistor 63 is described. The bypass transistor connects the input terminal 64 of the SC block 62 and a bypass line 61 between its source and drain. A gate electrode of the transistor 63 is connected to a control circuit that is placed inside the variable DC—DC converter circuit. When the bypass transistor 63 is turned on, the input terminal 64 of the SC block 62 is connected to the bypass line 61 and output of the SC block 65 of the preceding stage flows into the bypass line. Therefore, the current is sent to the SC block 62 of the subsequent stage skipping the SC block 62 of this stage.

FIG. 8 shows an example of the operation of the variable DC—DC converter when a switched capacitor type DC—DC converter is employed. For instance, in order to output the voltage of an input terminal 71 to an output terminal 72 as it is, bypass transistors (S1) 73 and (S3) 75 are turned on to bypass two SC blocks 76 and 77. In order to output a voltage twice the voltage of the input terminal 71 to the output terminal 72, the bypass transistor (S1) 73 and a bypass transistor (S2) 74 are turned on to operate one stage of SC block, the step-up SC block 76. In order to output a voltage four times the voltage of the input terminal 71, all the bypass transistors are turned off to operate two stages of SC blocks, the step-up SC blocks 76 and 77.

On the other hand, in the case where an LC type DC—DC converter is employed for the variable DC—DC converter 2, variable output is obtained by connecting the input terminal of the variable DC—DC converter 2 to the input terminal 41 (51) of the LC type DC—DC converter shown in FIG. 5 (FIG. 6) and by connecting the output terminal of the variable DC—DC converter 2 to the output terminal 45 (55) of the LC type DC—DC converter shown in FIG. 5 (FIG. 6). This is advantageous in terms of circuit scale because there is no need to form cascade connection of plural blocks unlike the case where a switched capacitor type DC—DC converter is used for the variable DC—DC converter 2.

The voltage detector 3 is for continuously monitoring the output voltage of the power feeding means 11, the voltage of the capacitor 6, and the input voltage of the load circuit 5, and for sending voltage detection information to the variable DC—DC converter 2 and to the control circuit 4.

The control circuit 4 receives the information from the voltage detector 3 and controls switching of the MOSFET switches (P1) 7 to (P4) 10 that are connected between the blocks of the power feeding means 11, the variable DC—DC converter 2, the load circuit 5, and the capacitor 6.

The transistors of the MOSFET switches (P1) 7 to (P4) 10 connect the blocks to one another and conduct switching operation upon receiving control signals from the control circuit 4. Here, these transistors are desirably P type transistors. If they are N type transistors, a gate voltage higher than a voltage inputted to a source is required in order to cause a current flow between the source and a drain and therefore another high voltage is necessary to control a gate of each transistor. In contrast, P type transistors can be turned on and off by using the output voltage of the variable DC—DC converter 2 for a gate control signal and accordingly there is no need to generate a high voltage specially for gate control.

Figure 9A:
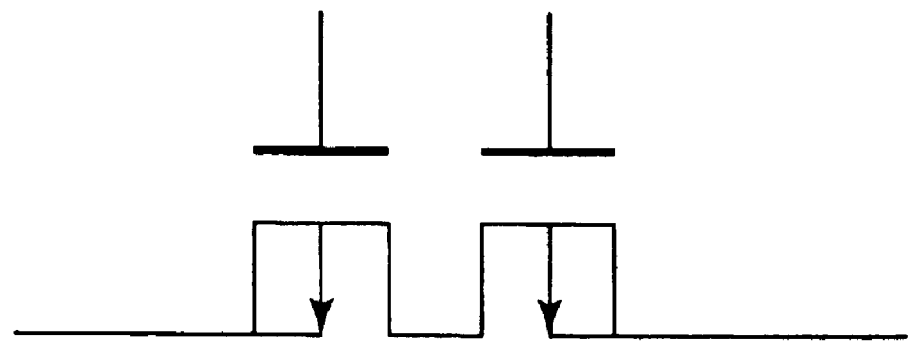
FIGS. 9A and 9B are circuit diagrams of a MOSFET switch according to a mode of the present invention.
Figure 9B:
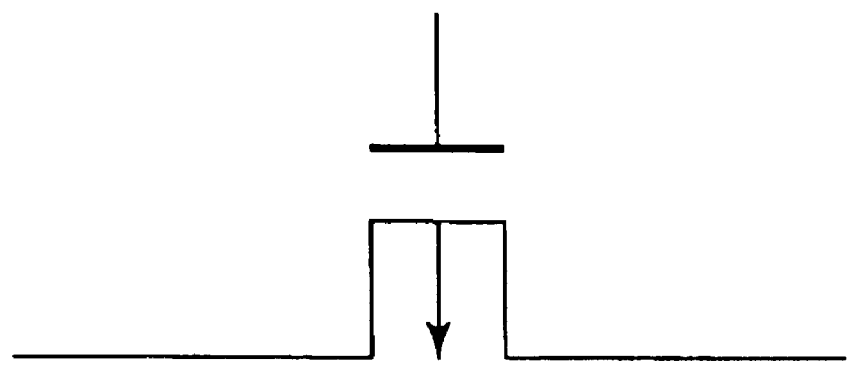

The MOSFET switches of the present invention exert even greater effects if fully-depleted SOI devices are used. In a bulk device, a substrate is usually connected to a source of a transistor and, if a MOSFET is used to build a switch in which a current flows in two directions, it is impossible to avoid countercurrent upon inversion of the source side voltage and the drain side voltage. For that reason, a bulk device prevents countercurrent by connecting two transistors as shown in FIG. 9A. In contrast, a fully-depleted SOI device can operate while a substrate (body region) is in a floating state and therefore, as shown in FIG. 9B, is capable of preventing countercurrent with one transistor when a current flows in two directions in the MOSFET switch. Accordingly, the number of transistors can be reduced by employing fully-depleted SOI devices for the MOSFET switches of the present invention.

Figure 10:
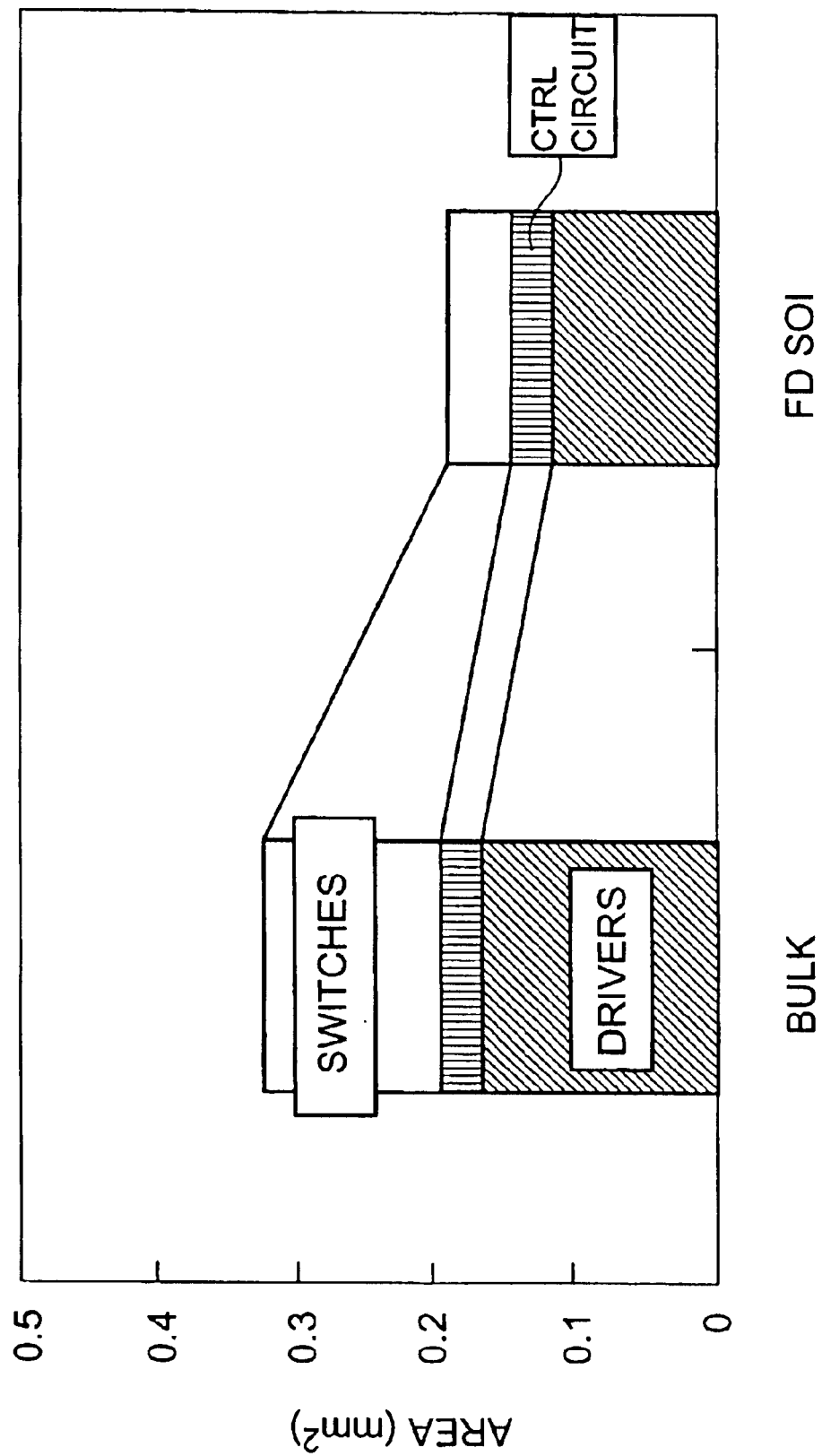
FIG. 10 is a graph showing an area effect of the MOSFET switch according to a mode of the present invention.

If the threshold voltage is equal, a fully-depleted transistor is lower in leak current than a bulk device by one digit. Therefore, the threshold voltage can be lowered and the transistor size of the MOSFET switches and an output driver can be reduced. FIG. 10 shows a chip area comparison between a power source inverter circuit of the present invention that is configured using bulk devices and a power source inverter circuit of the present invention that is configured using fully-depleted SOI devices. The graph shows that the use of fully-depleted SOI devices greatly reduces the areas of the MOSFET switches and of the output driver.

The capacitor 6 has a function of storing electric power outputted from the variable DC—DC converter 2 and a function of supplying the input of the variable DC—DC converter 2 with electric power when the power feeding means 11 stops generating electric power.

The load circuit 5 is an application circuit capable of operating on very low electric power. Since the system using the power source inverter circuit 1 of the present invention can operate solely on electric power generated by natural energy, the load circuit 5 is also designed to consume as little power as possible. One of techniques for limiting power consumption as much as possible is a circuit technique that uses a fully-depleted SOI device. Next, a description is given on the operation of the power source inverter circuit 1 according to the present invention. The description given here deals with the operation in the case where a thermoelectric conversion element is used as the power feeding means 11, but the operation also applies to the case where electric power is generated by other power feeding means such as a solar cell or a spiral spring. In this example, it is assumed that the variable DC—DC converter 2 uses a switched capacitor type DC—DC converter and that the voltage is stepped up four times at maximum.

Figure 11:
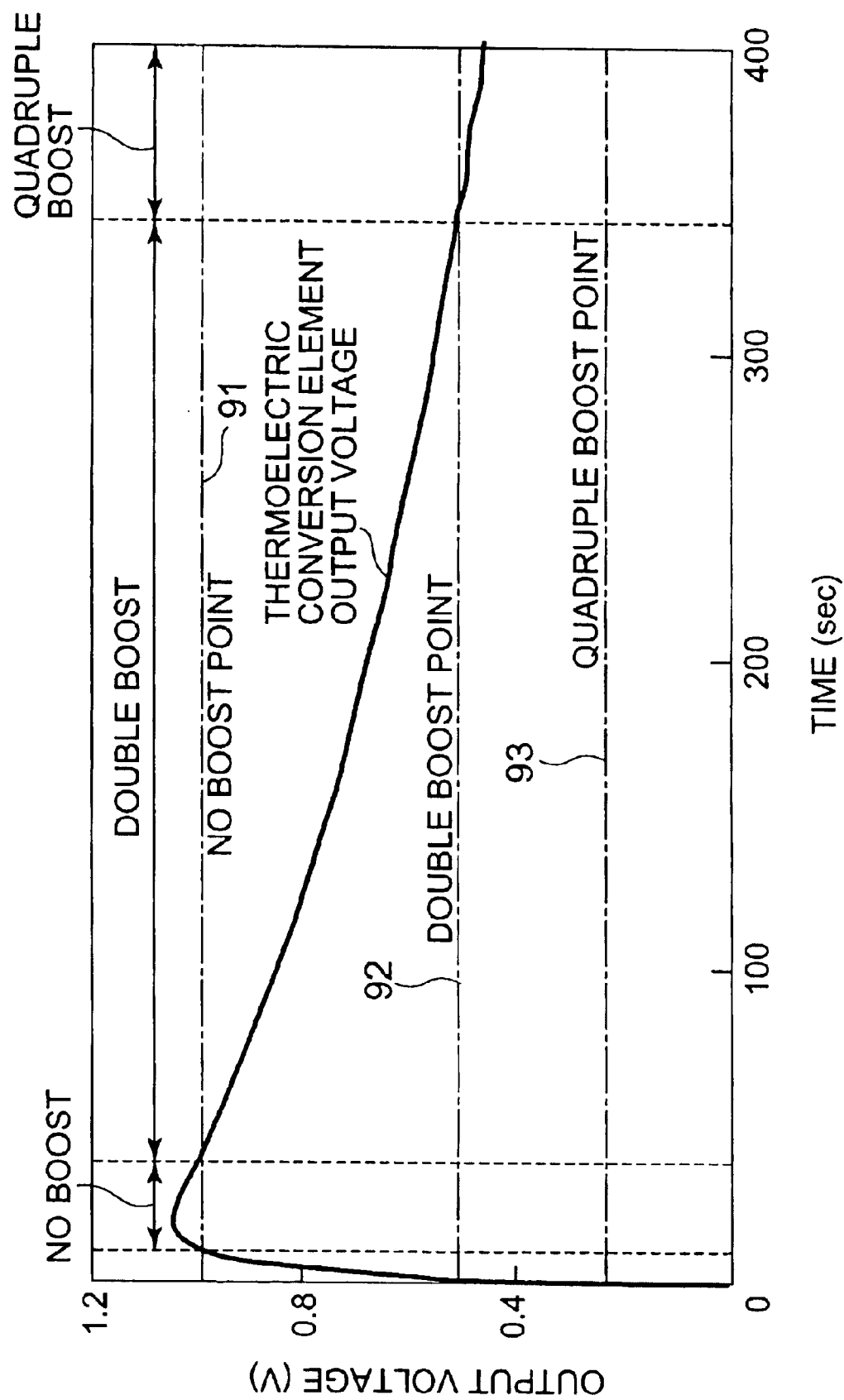
FIG. 11 is a graph showing a step-up stage number switching operation of a variable DC—DC converter according to a mode of the present invention.

A heat source is put on the thermoelectric conversion element, causing the output voltage to rise. As shown in FIG. 11, when the output voltage of the thermoelectric conversion circuit rises past the quadruple boost point, the voltage detector circuit 3 detects the voltage and sends signals to the variable DC—DC converter 2 and to the control circuit 4. Receiving the signals, the control circuit 4 turns on the MOSFET switch (P1) 7 out of all the MOSFET switches which have initially been off. This sends electric power to the variable DC—DC converter 2. The variable DC—DC converter 2 starts, upon receiving the signals from the voltage detector circuit 3, power conversion for quadruple boost and outputs the boosted power. Then, the control circuit 4 turns the MOSFET switch (P4) 10 on to send the electric power to the load circuit 5. During this, the voltage detector circuit 3 monitors the voltage of the load circuit 5, and in the case where the voltage exceeds the operation voltage of the load circuit 5, sends a signal to the control circuit 4, which turns the MOSFET switch (P4) 10 off and the MOSFET switch (P3) 9 on. This sends excess electric power which is not used to operate the load circuit 5 to the capacitor 6 to be stored therein. By alternately turning on and off the MOSFET switches (P3) 9 and (P4) 10, a constant voltage is outputted to the load circuit 5 and excess electric power is stored in the capacitor 6.

Next, when the output voltage of the thermoelectric conversion circuit further rises past the double boost point 92, the voltage detector circuit 3 detects the voltage and sends signals to the variable DC—DC converter 2 and to the control circuit 4. The variable DC—DC converter 2 starts, upon receiving the signals from the voltage detector circuit 3, power conversion for double boost and outputs the boosted power. As to the operation of the MOSFET switch, in a manner similar to that in the case of the above quadruple boost, the MOSFET switches (P3) 9 and (P4) 10 are alternately turned on and off, whereby a constant voltage is outputted to the load circuit 5 and excess electric power is stored in the capacitor 6.

Further, when the output voltage of the thermoelectric conversion circuit rises past the no boost point 91, the voltage detector circuit 3 detects the voltage and sends signals to the variable DC—DC converter 2 and to the control circuit 4. The variable DC—DC converter 2 starts, upon receiving the signals from the voltage detector circuit 3, power conversion for Non boost and outputs the power. The operations of the MOSFET switch (P3) 9 and (P4) 10 are similar to those in the case of the above double boost and quadruple boost.

Thereafter, when the output voltage of the thermoelectric conversion circuit becomes lower than the no boost point 91, the variable DC—DC converter carries out power conversion for double boost and outputs the boosted power. When the output voltage becomes lower than the double boost point 92, the variable DC—DC converter carries out power conversion for quadruple boost and outputs the boosted power.

Then, when the output voltage of the thermoelectric conversion circuit becomes lower than the quadruple boost point 93, the voltage detector circuit 3 detects the voltage and sends signals to the variable DC—DC converter and to the control circuit 4. Receiving the signals, the control circuit 4 turns the MOSFET switches (P1) 7, (P3) 9, and (P4) 10 off and the MOSFET switch (P2) 8 on to send the electric power that has been stored in the capacitor 6 to the input of the variable DC—DC converter 2. Receiving the voltage information of the capacitor 6 from the voltage detector circuit 3, the variable DC—DC converter 2 determines the step-up multiple number, conducts power conversion, and outputs the boosted power. At this point, the control circuit 4 turns the MOSFET switch (P4) 10 on to send the electric power to the load circuit 5. During this, the voltage detector circuit 3 monitors the voltage of the load circuit 5, and in the case where the voltage exceeds the operation voltage of the load circuit 5, sends a signal to the control circuit 4, which turns the MOSFET switch (P4) 10 off. This causes the voltage of the load circuit 5 to start its descent and the voltage detector circuit 3 sends a detection signal to the control circuit 4 to turn the MOSFET switch (P4) 10 on once more. By alternately turning the MOSFET switch (P4) 10 on and off, a constant voltage is supplied to the load circuit 5.

In a power source inverter circuit structured in a manner similar to that of the present invention, it is more often than not that a load circuit is continuously connected to a capacitor. In this case, it takes time to store electric charges in the capacitor after power feeding means begins to output electric power and send it to a variable DC—DC converter. Since the load circuit does not start its operation until electric charges are stored in the capacitor, it is very inconvenient. The power source inverter circuit of the present invention, on the other hand, has the MOSFET switches (P3) 9 and (P4) 10 between the variable DC—DC converter 2 and the capacitor 6 and between the variable DC—DC converter 2 and the load circuit 5, and the MOSFET switches (P3) 9 and (P4) 10 are switched between on and off in accordance with the voltage level of the load circuit 5. Therefore, the power source inverter circuit of the present invention is advantageous in that the load circuit 5 can be put into operation as soon as the power feeding means 11 outputs electric power.

In the case where the power feeding means 11 is a natural energy source, the amount of electric power outputted from the power feeding means 11 is greatly affected by a change in its surroundings. Accordingly, there is no assurance that maximum electric power can be taken out when necessary. The present invention is characterized by a concept that as much electric power as possible should be taken out and stored in the capacitor 6 while the power feeding means has high power generation ability.

The relation between the output voltage of a natural energy source and the current thereof has a local maximal value which leads to the maximum power generation efficiency. When a thermoelectric conversion element is employed, the maximum power generation efficiency is obtained by taking out a current such that the output voltage equals to half the open-circuit output voltage. In a conventional power source inverter circuit where the amount of electric power outputted from power feeding means is determined in accordance with power consumption of a load circuit, electric power is not always taken out with maximum power generation efficiency. In contrast, the power source inverter circuit of the present invention can set the voltage conversion multiple number of the variable DC—DC converter 2 in accordance with the input voltage, and in addition, can store excess electric power in the capacitor 6 when more electric power than is needed by the load circuit 5 is generated. The power source inverter circuit of the present invention thus can always take out electric power with the maximum power generation efficiency of a natural energy source.

Figure 12:
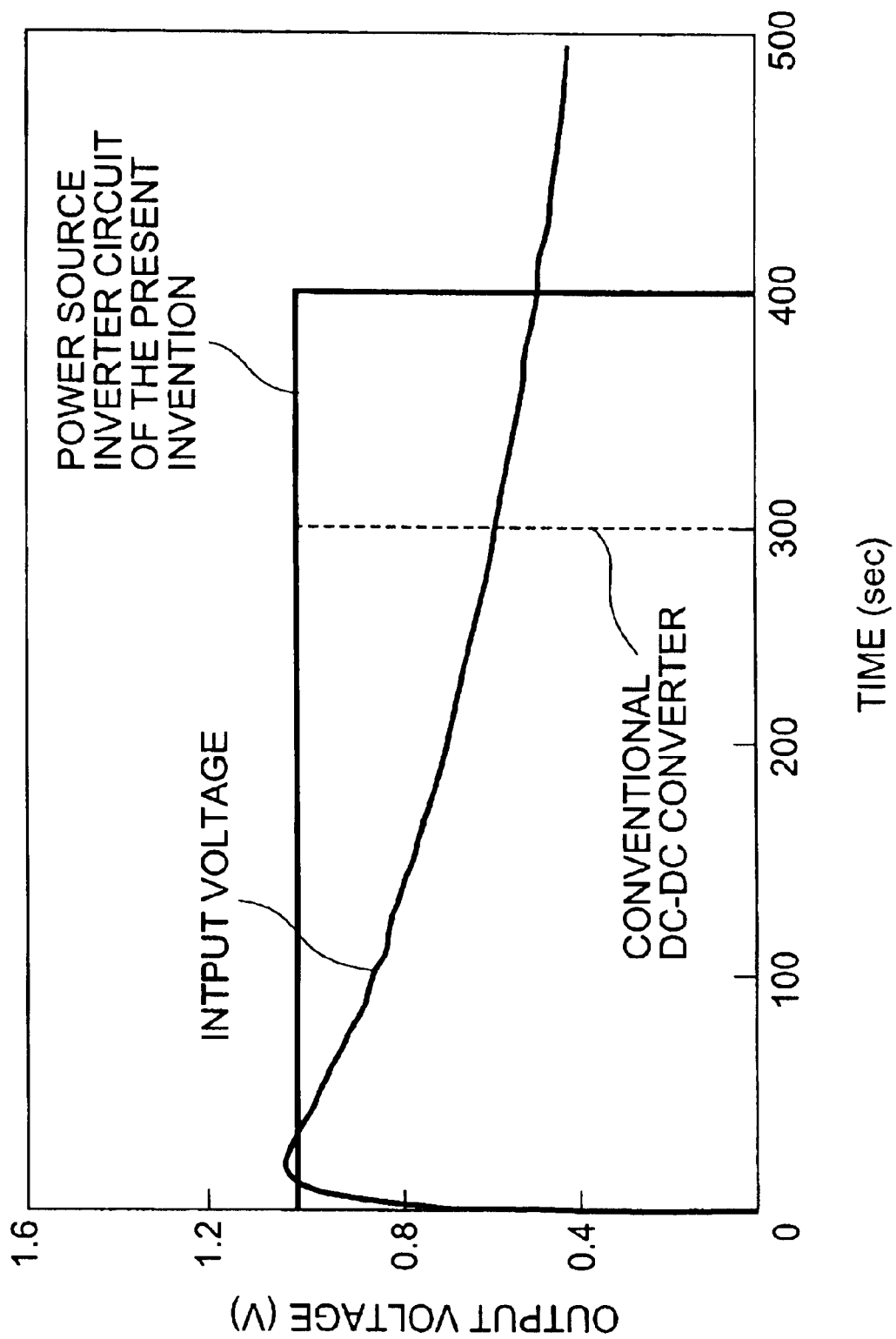
FIG. 12 is a graph showing the duration of operation of a load circuit in a case where a power source inverter circuit according to a mode of the present invention is used.

The power source inverter circuit 1 of the present invention thus makes it possible to use up every bit of electric power generated by the power feeding means 11 by varying the step-up and step-down multiple numbers of the DC—DC converter and by returning electric power that has been stored in the capacitor to the variable DC—DC converter 2 to send it to the load circuit 5. FIG. 12 shows comparison between the power source inverter circuit of the present invention and a conventional power source inverter circuit where the multiple number is fixed regarding how long the load circuit 5 continues to operate. The graph shows that the power source inverter circuit of the present invention can hold the operation voltage 1.3 times longer than the conventional DC—DC converter of fixed multiplying factor if the electric power generated is equal.

As has been described, according to the present invention, the power source inverter circuit is provided with: the variable DC—DC converter for raising or dropping the voltage of electric power which is supplied from the power feeding means; the storage means for storing electric power whose voltage has been raised or dropped by the variable DC—DC converter; the MOSFET switch for connecting an output of the power feeding means to an input of the variable DC—DC converter; the MOSFET switch for connecting an output of the variable DC—DC converter to an input of the storage means; the MOSFET switch for connecting the output of the variable DC—DC converter to an input of a load circuit; the MOSFET switch for connecting the input of the variable DC—DC converter to the input of the storage means; the control circuit for controlling gates of the MOSFET switches; and the voltage detector for monitoring the output voltage of the power feeding means, the voltage of the storage means, and the input voltage of the load circuit, and for outputting voltage information to the variable DC—DC converter and to the control circuit. Therefore, the present invention has an effect of outputting a constant voltage to the load circuit even when the output voltage of the feeding means fluctuates.

When the power feeding means is a natural energy source, the relation between the output voltage and the current has a local maximal value which is the maximum power generation efficiency. In contrast to a conventional power source inverter circuit where the amount of electric power outputted from power feeding means is determined in accordance with power consumption of a load circuit, the power source inverter circuit of the present invention structured as above can always take out electric power with the maximum power generation efficiency of a natural energy source and can store excess electric power in the capacitor while consuming the generated electric power in the load circuit.

Moreover, the present invention makes it possible to use up every bit of electric power generated by the power feeding means since excess electric power is stored in the capacitor when more electric power than is needed by the load circuit is generated and outputted from the power feeding means so that the stored electric power is used after the power feeding means stops outputting electric power.

Unlike prior art where electric power stored in storage means is directly connected to a load circuit, the power source inverter circuit of the present invention returns electric power that has been stored in the storage means to the DC—DC converter for voltage conversion. The present invention thus makes it possible to use up electric power without wasting any.

Another effect of the present invention is that the load circuit can start its operation as soon as the power feeding means outputs electric power by placing the MOSFET switches between the output of the variable DC—DC converter and the load circuit and between the output of the variable DC—DC converter and the storage means.

The variable DC—DC converter is composed of cascade connection of blocks each of which is a combination of a switched capacitor type DC—DC converter and a bypass transistor. Accordingly, a higher power conversion efficiency is obtained in a low power consumption IC region.

Another effect of the present invention is that the number of transistors can be reduced by using fully-depleted SOI devices for the MOSFET switches. This is because the use of fully-depleted SOI devices makes it possible to prevent countercurrent with one transistor as opposed to a usual bulk device where two transistors are connected in order to avoid countercurrent upon inversion of the source side voltage and the drain side voltage.

The use of fully-depleted SOI transistors provides another effect that the transistor size of the MOSFET switches and the output driver can be reduced. This is because a fully-depleted SOI device is lower in leak current than a bulk device by one digit and the threshold voltage can be lowered.

Figure 13:
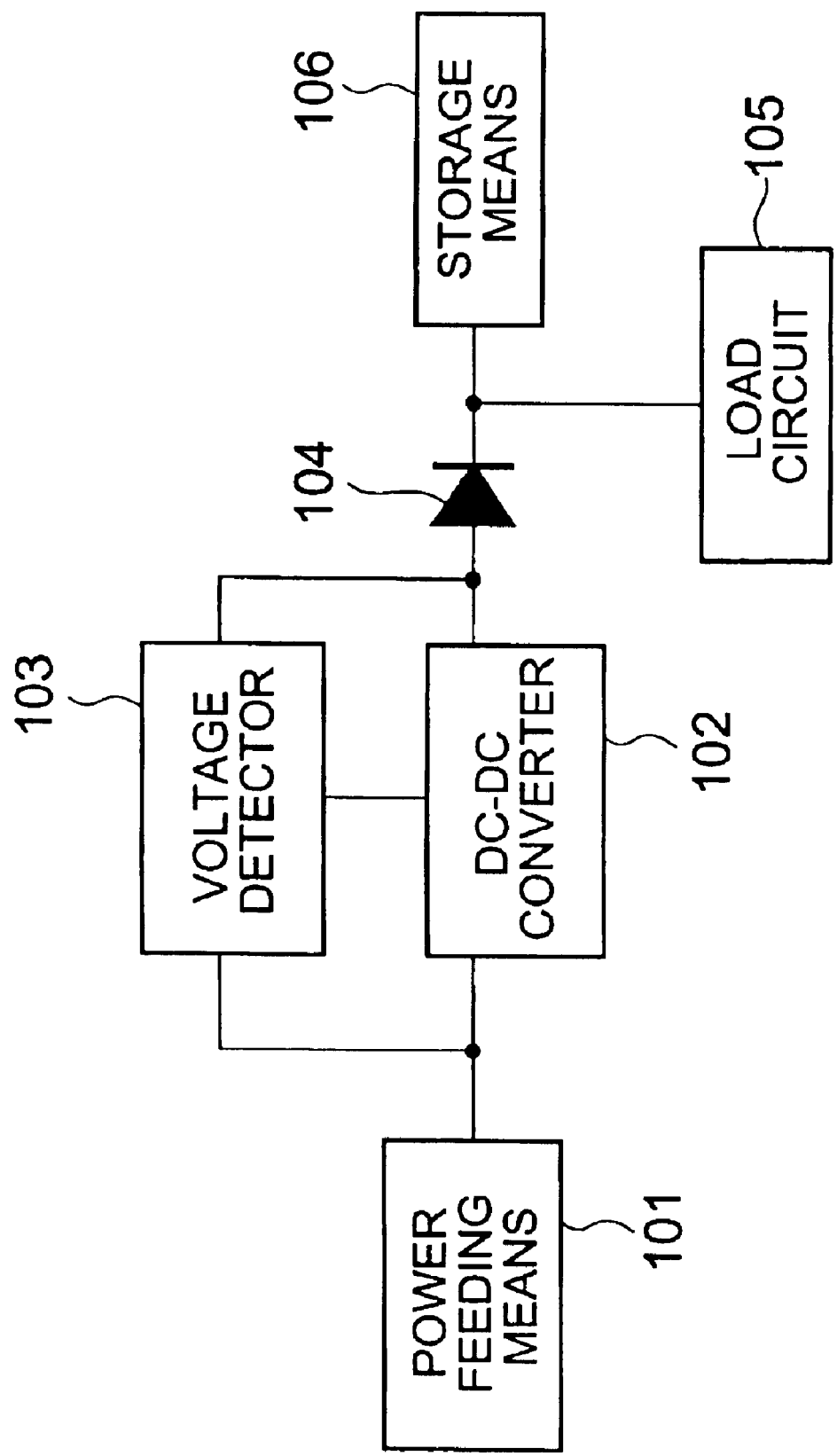
FIG. 13 is a diagram showing a conventional power source inverter circuit.

FIG. 1
POWER FEEDING MEANS
VOLTAGE DETECTOR
VARIABLE DC—DC CONVERTER
CONTROL CIRCUIT
LOAD CIRCUIT
FIG. 11
NO BOOST
DOUBLE BOOST
QUADRUPLE BOOST
THERMOELECTRIC CONVERSION ELEMENT OUTPUT VOLTAGE
NO BOOST POINT
DOUBLE BOOST POINT
QUADRUPLE BOOST POINT
FIG. 12
CONVENTIONAL DC—DC CONVERTER
POWER SOURCE INVERTER CIRCUIT OF THE PRESENT INVENTION
FIG. 13
POWER FEEDING MEANS
VOLTAGE DETECTOR
DC—DC CONVERTER
STORAGE MEANS
LOAD CIRCUIT

What is claimed is:

1. A power source inverter circuit comprising:
   a variable DC—DC converter for raising or dropping a voltage of electric power which is supplied from power feeding means;
   storage means for storing electric power whose voltage has been raised or dropped by the variable DC—DC converter;
   a MOSFET switch for connecting an output of the power feeding means to an input of the variable DC—DC converter;
   a MOSFET switch for connecting an output of the variable DC—DC converter to an input of the storage means;
   a MOSFET switch for connecting the output of the variable DC—DC converter to an input of a load circuit;
   a MOSFET switch for connecting the input of the variable DC—DC converter to the input of the storage means;
   a control circuit for controlling gates of the MOSFET switches; and
   a voltage detector for monitoring an output voltage of the power feeding means, a voltage of the storage means, and an input voltage of the load circuit, and for outputting voltage information to the variable DC—DC converter and to the control circuit.

2. A power source inverter circuit according to claim 1, wherein the variable DC—DC converter is composed of a switched capacitor type DC—DC converter and a bypass transistor, the switched capacitor type DC—DC converter being constituted of four MOSFET transistors and two capacitors, and the bypass transistor having a source terminal connected to an input terminal of the switched capacitor type DC—DC converter and having a drain terminal connected to a bypass line.

3. A power source inverter circuit according to claim 2, wherein the variable DC—DC converter has a plurality of blocks each including the switched capacitor DC—DC converter and the bypass transistor, the blocks being connected through a cascade connection.

4. A power source inverter circuit according to claim 1, wherein the variable DC—DC converter is composed of a MOSFET transistor, an inductor, a capacitor, and a diode.

5. A power source inverter circuit according to claim 1, wherein the MOSFET switches are each composed of a fully-depleted SOI device.

* * * * *